Patented Oct. 24, 1944

2,361,093

UNITED STATES PATENT OFFICE 2,361,093

CONDENSATION PRODUCTS AND PROCESS OF PREPARING SAME

Charles Graenacher, Riehen, and Richard Sallmann, Bottmingen, Switzerland, assignors to Society of Chemical Industry in Basle, Basel, Switzerland, a firm No Drawing. Application July 14, 1941, Serial No. 402,438. In Switzerland July 20, 1940

19 Claims. (Cl. 260—295)

It has been found that valuable condensation products are obtained by converting diamides which are derived from carbocyclic diamines such as aromatic or cycloaliphatic diamines into halogen methyl derivatives and if desired exchanging at least one of the halogen atoms contained in the halogen methyl derivatives for a group which produces or increases solubility in water.

As diamides there may be used such aromatic or cycloaliphatic diamines in the present process in which both amino-groups are acylated, i. e. for instance converted into carboxylic acid amide, urethane or urea groups. As starting materials there are used appropriately diamides having the atom grouping

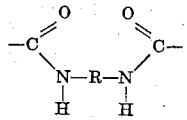

wherein R represents an aromatic or cycloaliphatic bivalent residue.

Among the aromatic and cycloaliphatic diamines from which the diamides are derived which are to be used as starting materials, there may be named: diamines of the benzene and naphthalene series such as meta- and para-phenylenediamine, 2:4-diaminotoluene, 1:4- and 1:5-naphthylenediamine; diamines of the diphenyl series, such as benzidine, ortho-tolidine, dianisidine; diamines which are derived from other diphenyl compounds in which two benzene nuclei are united with each other by a bridge, for instance consisting of

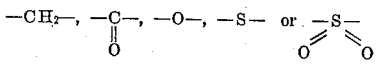

for example from diphenylmethane, diphenylether, diphenylsulfide, benzophenone or diphenylsulfone; cycloaliphatic diamines, such as meta-diaminocyclohexane. As starting materials there are thus used preferably such diamines in which the two amino groups are separated from each other by a chain of at least 3 carbon atoms.

The carboxylic acid diamides to be used as starting materials which are derived from the cited aromatic or cycloaliphatic diamines, may contain as acyl radicals radicals of monobasic or polybasic, saturated or unsaturated carboxylic acids of the aliphatic, aromatic, mixed aliphatic-aromatic, cycloaliphatic or heterocyclic series, they may, if desired, also contain a higher molecular aliphatic or cycloaliphatic radical. There are included, for example, the amides from the indicated aromatic or cycloaliphatic diamines and from carboxylic acids, such as formic, acetic, propionic, butyric, valeric, caproic, capric, lauric, myristic, palmitic, stearic, behenic undecylenic, oleic, linoleic, linolenic, chlor-acetic, salicylic, oxy-naphthoic, phenyl-acetic, phthalic, hexahydrobenzoic acid, also from montan, naphthene and resin acids.

The aromatic or cycloaliphatic diamines diacylated with carboxylic acids to be used in the present invention are either known or they can be readily manufactured by processes quite analogous to the known ones, e. g. from the corresponding carboxylic acid halides or esters or from the carboxylic acids and amines direct.

Among the diamines containing urea groups which may be used as starting materials for the present process, there may be named the ureas corresponding to the aromatic or cycloaliphatic diamines which may also contain alkyl or acyl radicals. Insofar as the urea derivatives have not been described, they can be produced according to the usual methods.

Among the diamides containing urethane groups which may further be used as starting materials for the present process, there are named aromatic and cycloaliphatic diamines which have been acylated in both amino groups with aid of chloroformic acid esters, for example such of higher molecular alcohols, such as stearyl alcohol. Insofar as these urethanes have not been described, they can be produced according to the usual methods.

In the diamides to be used as starting materials the two acyl radicals may be of similar or different nature. Examples for this are distearoyl - meta - phenylenediamine, distearoyl - para-phenylenediamine, stearoyl - acetyl - meta - phenylenediamine.

The conversion of the diamides which are derived from aromatic or cycloaliphatic diamines into halogen methyl derivatives may be effected by treating the diamides with agents known to introduce the halogen methyl group, for instance with formaldehyde and a hydrogen halide, preferably however with α:α'-dihalogendimethylethers, such as α:α'-dichlorodimethylether, α:α'-dibromodimethylether, further with other α:α'-dihalogenalkylethers, such as α-chloromethyl-α'-chloroethylether or α:α'-dichlorodiethylether.

The new condensation products containing halogen-methyl groups obtainable according to the present process are liquid or solid substances which contain highly reactive halogen atoms. These mobile halogen atoms can be converted very easily by known methods into groups producing water-solubility such as quaternary ammonium groups. The mobile halogen atoms can moreover be replaced by amino or imino groups or by thiourea radicals, further by radicals which are derived from dicyandiamide, which groups, after conversion into salt-form, likewise produce water-solubility. A preferred form of carrying out the invention consists in introducing as water-solubilizing group a member of the group consisting of quaternary ammonium groups, isothiourea radicals and radicals which are derived from dicyandiamide, both groups of radicals in the form of salts, and this by reaction of the halogenmethyl derivatives with a member of the group consistings of tertiary amines, thioureas capable of reacting in the iso-form, and dicyandiamide.

Further it is possible to exchange the mobile halogen atoms by reaction with salts of halogen carboxylic acids for ester-like radicals which correspond to the halogen carboxylic acids used, into which radicals groups producing water-solubility may be introduced.

The products obtainable by the present process can, if the starting materials are appropriately chosen, be used inter alia as auxiliary products, for example in the textile, leather and paper industry.

The products of the present invention may be designated as diacylated carbocyclic diamines in which at least one nitrogen atom of an acylamino group is connected through a bridge derived from at least one mol of formaldehyde with a water-solubilizing group, which products are liquid to solid substances which are soluble or easily dispersible in water to form solutions or dispersions which are decomposed by boiling or by treating with alkalies, water-insoluble compounds being formed.

By a bridge which is derived from one mol of formaldehyde there is to be understood the methylene bridge —CH$_2$—. A bridge which is derived from 2 mols of formaldehyde is contained in the bridge —CH$_2$—O—CH$_2$—. The existence of a bridge which is derived from at least 1 mol of formaldehyde brings about the technically valuable properties of the products of the present process, viz. their capability of being decomposed in the heat. If materials, such as textiles from cellulose, are impregnated with the water-soluble products of this invention and heated after drying, for instance to 120–150° C., residues which originate from the products of the present invention can be fixed on the treated material in a manner fast to washing, whereby especial effects, for instance a water-repellency which is fast to washing, may be attained.

The following examples illustrate the invention, the parts being by weight:

Example 1

50 parts of distearoyl-meta-phenylenediamine are heated for 2 hours to 100–105° C. with 75 parts by volume of α:α'-dichlorodimethylether, while stirring, whereupon the evolution of hydrochloric acid is complete. After distilling the dichlorodimethylether in excess there remains a residue of 77 parts, which is dissolved in 750 parts by volume of dry acetone. The solution is filtered, cooled to 0° C. and 24 parts of finely pulverized thiourea are strewn into the solution at this temperature. The temperature rises to 20° C. in the course of about 30 minutes, whereupon a sample of the solution dissolves in water. It is filtered and the residue is freed from acetone in a vacuum. There is obtained a feebly yellow coloured powder, the solution of which in alcohol produces on addition of water clear foaming solutions which are decomposed by continuous boiling. The new product corresponds very probably to the formula

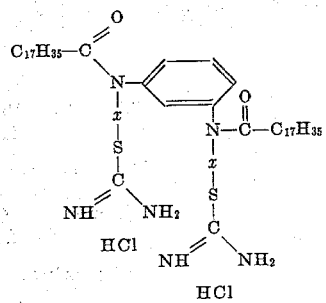

wherein $x$ represents a bridge which is derived from at least one mol of formaldehyde.

Example 2

20 parts of distearoyl-para-phenylenediamine obtained by heating molecular quantities of para-phenylenediamine and stearic acid, if required in presence of catalysts whereby the theoretical quantity of water is formed, are heated for 2 hours to 100–105° C. with 30 parts by volume of α:α'-dichlorodimethylether, while stirring. After this time the evolution of hydrochloric acid which is strong at the beginning, is complete. After distilling the dichlorodimethylether in excess in a vacuum at water-bath temperature, the residue is dissolved in 300 parts by volume of dry acetone, the solution is filtered and 10 parts of finely pulverized thiourea are strewn into it at 10° C., while stirring. After about 30 minutes when the temperature has risen to 20° C., a sample is clearly soluble in water. After cooling to 5° C. the whole is filtered and the residue is freed from acetone at ordinary temperature. The condensation product is obtained in the form of a white powder. When dissolved in little alcohol and poured into water there is obtained a clear solution which becomes turbid by constant boiling, more rapidly after addition of sodium acetate. The new product corresponds very probably to the formula

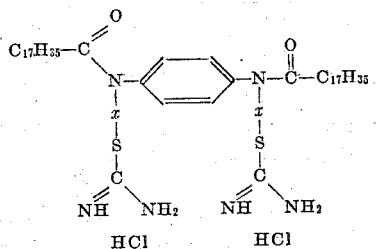

wherein $x$ represents a bridge which is derived from at least one mol of formaldehyde.

A product which behaves similarly is obtained when using the condensation product from para-phenylenediamine and hydrogenated train oil fatty acid, or the condensation product from 1:5-naphthylenediamine or from meta-diaminocyclohexane and naphthenic acid, or the urethane from 4:4'-diaminodiphenylether and from chloroformic acid octadecylester or the 1:4-di-(octadecylureido)-benzene.

Instead of with thiourea itself, the halogenmethyl derivatives of the above indicated parent compounds may be reacted with other thioureas capable of reacting in the iso-form, for instance with alkylated thioureas, with tertiary amines, such as trimethylamine, further with dicyandiamide.

Example 3

10 parts of distearoyl-benzidine obtained by condensation of 1 mol of benzidine with 2 mols of stearic acid chloride in pyridine, are heated for 2 hours to 100–105° C. with 20 parts by volume of α:α'-dichlorodimethylether, while stirring, after which time the evolution of hydrochloric acid is complete. After distilling the dichlorodimethylether in excess there remains a yellowish viscous residue. When heating this for a short time with pyridine in excess there is obtained a water-soluble product. The aqueous solution foams strongly and has pronounced cation-active properties.

The new product corresponds very probably to the formula

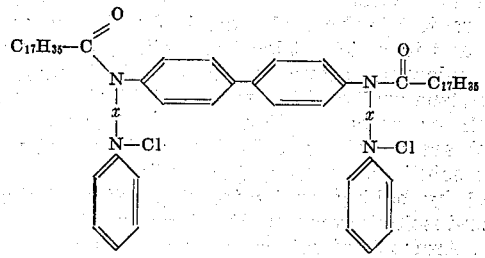

wherein $x$ represents a bridge which is derived from at least one mol of formaldehyde.

Instead of benzidine there may be used in similar manner diamines which are derived from diphenylmethane, diphenylethers, diphenylsulfide or benzophenone. Instead of with stearic acid the cited diamines can be acylated with acetic acid, lauric acid, benzoic acid or naphthenic acid. Finally thioureas and dicyandiamide may be used in similar manner instead of pyridine.

Example 4

30 parts of acetyl-stearoyl-meta-phenylenediamine obtained by condensation of acetyl-meta-phenylenediamine with stearic acid chloride in pyridine, are heated for 2 hours to 100–105° C. with 50 parts by volume of α:α'-dichlorodimethylether, while stirring. After distilling the dichlorodimethylether in excess in a vacuum on the steam bath the residue is dissolved in 200 parts by volume of dry acetone. The solution is filtered and after cooling to 0° C. 14.7 parts of finely pulverized thiourea are strewn into it. The reaction product separates in the form of a resinous, yellow mass. After decanting the acetone the residue of the adhering acetone is removed in a vacuum. The product is soluble in water with formation of strongly foaming solutions which become turbid by continuous boiling.

The new product corresponds very probably to the formula

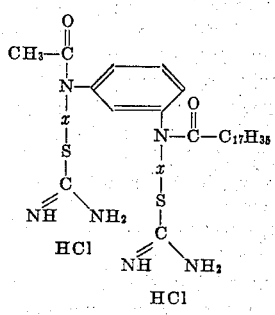

wherein $x$ represents a bridge which is derived from at least one mol of formaldehyde.

Example 5

10 parts of the product of Example 1 are dissolved in the heat in 20–30 parts of alcohol and the solution is poured into 1000 parts of cold water. There is obtained a completely clear, feebly foaming solution which is hardly changed also after standing for 24 hours.

10 parts of sodium acetate are added to the solution thus obtained, and boiled wind jacket cloth is foularded twice in this solution, squeezed so that the weight of the cloth is increased 70 per cent, whereupon it is dried at 60–70° C. by heating the fabric pretreated in such a manner for 4 minutes to 100–145° C., it becomes highly water-repellent, which property is not lost even after boiling the cloth for ½ hour in a liquor which contains 5 grams of soap and 2 grams of sodium carbonate per liter.

In addition to the water-repelling properties the product treated in such a manner shows also an excellent softness which is fast to washing.

What we claim is:

1. Process for the manufacture of condensation products, which comprises condensing a carbocyclic diamine, in which the two amino-groups are separated from each other by a chain of at least 3 carbon atoms and in which the two amino groups are monoacylated, at least one of the two acyl radicals being the acyl radical of a higher fatty acid, with a member of the group consisting of α:α'-dichlorodimethylether and a mixture of formaldehyde and hydrogen chloride to form halogenmethyl derivatives of the diacylated diamine.

2. Process for the manufacture of condensation products, which comprises condensing a carbocyclic diamine, in which the two amino-groups are separated from each other by a chain of at least 3 carbon atoms and in which the two amino groups are monoacylated, at least one of the two acyl radicals being the acyl radical of a higher fatty acid, with a member of the group consisting of α:α'-dichlorodimethylether and a mixture of formaldehyde and hydrogen chloride to form halogenmethyl derivatives of the diacylated diamine, and effecting a water-solubilizing step by transforming at least one halogen atom of the halogenmethyl derivatives into a water-solubilizing group.

3. Process for the manufactture of condensation products, which comprises condensing an aromatic diamine, in which the two amino-groups are separated from each other by a chain of at least 3 carbon atoms and in which the two amino groups are monoacylated, at least one of the two acyl radicals being the acyl radical of a higher fatty acid, with an α:α'-dihalogendimethyl ether to form halogenmethyl derivatives of the diacylated diamine, and effecting a water-solubilizing step by transforming at least one halogen atom of the halogenmethyl derivatives into a water-solubilizing group.

4. Process for the manufacture of condensation products, which comprises condensing an aromatic diamine, in which the two amino-groups are separated from each other by a chain of at least 3 carbon atoms and in which the two amino groups are monoacylated with carboxylic acids, at least one of the two acyl radicals being the acyl radical of a higher fatty acid, with an α:α'-dihalogendimethyl ether to form halogenmethyl derivatives of the diacylated diamine, and effecting a water-solubilizing step by transforming at least one halogen atom of the halogenmethyl derivatives into a water-solubilizing group.

5. Process for the manufacture of condensation products, which comprises condensing an aromatic diamine, in which the two amino-groups are separated from each other by a chain of at least 3 carbon atoms and in which the two amino groups are monoacylated with aliphatic carboxylic acids, containing at least 12 carbon atoms, with an α:α'-dihalogendimethyl ether, to form halogenmethyl derivatives of the diacylated diamine, and transforming at least one halogen atom of the halogenmethyl groups into an isothiourea radical in salt form by treatment with a thiourea capable of reacting in the isoform.

6. Process for the manufacture of condensation products, which comprises condensing a diamine of the benzene series, in which the two amino-groups are separated from each other by a chain of at least 3 carbon atoms and in which the two amino groups are monoacylated with aliphatic carboxylic acids containing at least 16 carbon atoms, with an α:α'-dihalogen-dimethylether to form halogenmethyl derivatives of the diacylated diamine, and transforming at least one halogen atom of the halogen-methyl groups into an isothiourea radical in salt form by treatment with a thiourea capable of reacting in the iso form.

7. Process for the manufacture of a condensation product which comprises condensing α:α'-dichlorodimethylether with N:N'-distearoyl metaphenylene diamine to form a chloromethyl derivative of the N:N'-distearoyl meta-phenylene diamine and transforming the chlorine atoms of the two halogen-methyl groups into a radical of the isothiourea hydrochloride by treatment with thiourea.

8. Process for the manufacture of a condensation product which comprises condensing α:α'-dichlorodimethylether with N:N'-distearoyl paraphenylene diamine to form a chloromethyl derivative of the N:N'-distearoyl para-phenylene diamine, and transforming the chlorine atoms of the two halogenmethyl groups into a radical of the isothiourea hydrochloride by treatment with thiourea.

9. Process for the manufacture of condensation products, which comprises condensing a diamine of the diphenyl series, in which the two amino groups are monoacylated with aliphatic carboxylic acids containing at least 3 carbon atoms, with an α:α'-dihalogen dimethylether to form halogenmethyl derivatives of the diacylated diamine, and transforming at least one halogen atom of the halogen methyl groups into a quaternary ammonium group by treatment with a tertiary amine.

10. Process for the manufacturing of a condensation product which comprises condensing α:α'-dichlorodimethylether with N:N'-distearoylbenzidine to form a chloromethyl derivative of the N:N'-distearoylbenzidine and transforming the chlorine atoms of the two halogenmethyl groups into pyridinium chloride groups by treatment with pyridine.

11. Diacylated carbocyclic diamines in which the two amino groups are separated from each other by a chain of at least 3 carbon atoms, in which at least one acyl radical is the acyl radical of a higher fatty acid and in which at least one nitrogen atom of an acylamino group is connected through a methylene bridge with a water-solubilizing group, which products are liquid to solid substances which are soluble or easily dispersible in water to form solutions or dispersions which are decomposed by boiling or by treating with alkalies, water-insoluble compounds being formed.

12. Diacylated aromatic diamines in which the two amino groups are separated from each other by a chain of at least 3 carbon atoms, in which at least one acyl radical is the acyl radical of a higher fatty acid and in which at least one nitrogen atom of an acylamino group is connected through a methylene bridge with a water-solubilizing group, which products are liquid to solid substances which are soluble or easily dispersible in water to form solutions or dispersions which are decomposed by boiling or by treating with alkalies, water-insoluble compounds being formed.

13. Aromatic diamines in which the two amino groups are mono-acylated with carboxylic acids and are separated from each other by a chain of at least 3 carbon atoms, in which at least one acyl radical is the acyl radical of a higher fatty acid and in which at least one nitrogen atom of an acylamino group is connected through a methylene bridge with a water-solubilizing group, which products are liquid to solid substances which are soluble or easily dispersible in water to form solutions or dispersions which are decomposed by boiling or by treating with alkalies, water-insoluble compounds being formed.

14. Aromatic diamines in which the two amino groups are mono-acylated with aliphatic carboxylic acids containing at least 12 carbon atoms and are separated from each other by a chain of at least 3 carbon atoms and in which at least one nitrogen atom of an acylamino group is connected through a methylene bridge with an isothiourea radical in salt form, which products are liquid to solid substances which are soluble or easily dispersible in water to form solutions or dispersions which are decomposed by boiling or by treating with alkalies, water-insoluble compounds being formed.

15. Diamines of the benzene series in which the two amino groups are monoacylated with aliphatic carboxylic acids containing at least 16 carbon atoms and are separated from each other by a chain of at least 3 carbon atoms and in which at least one nitrogen atom of an acylamino group is connected through a methylene bridge with an isothiourea radical in salt form, which products are liquid to solid substances which are soluble or easily dispersible in water to form solutions or dispersions which are decomposed by boiling or by treating with alkalies, water-insoluble compounds being formed.

16. N:N'-distearoyl-meta-phenylene diamine in which the nitrogen atoms of the acylamino groups are connected through a methylene bridge with the sulfur atom of the isothiourea hydrochloride radical, which product is a solid substance which is soluble in water to form solutions which are decomposed by boiling or by treating with alkalies, water-insoluble compounds being formed.

17. N:N'-distearoyl-para-phenylene diamine in which the nitrogen atoms of the acylamino groups are connected through a methylene bridge with the sulfur atom of the isothiourea hydrochloride radical, which product is a solid substance which is soluble in water to form solutions which are decomposed by boiling or by treating with alkalies, water-insoluble compounds being formed.

18. Diamines of the diphenyl series in which the two amino groups are mono-acylated with aliphatic carboxylic acids containing at least 16 carbon atoms and are separated from each other by at least 3 carbon atoms, in which at least one nitrogen atom of an acylamino group is connected through a methylene bridge with a quaternary ammonium group, which products are liquid to solid substances which are soluble or easily dispersible in water to form solutions or dispersions which are decomposed by boiling or by treating with alkalies, water-insoluble compounds being formed.

19. N:N'-distearoyl-benzidine in which the nitrogen atoms of the acylamino groups are connected through a methylene bridge with the nitrogen atom of the pyridinium chloride radical, which product is a solid substance which is soluble in water to form solutions which are decomposed by boiling or by treating with alkalies, water-insoluble compounds being formed.

CHARLES GRAENACHER.
RICHARD SALLMANN.